United States Patent
O'Connor et al.

(10) Patent No.: US 7,824,540 B2
(45) Date of Patent: Nov. 2, 2010

(54) PROCESS FOR UPGRADING LIQUID HYDROCARBON FEEDS

(75) Inventors: Paul O'Connor, Hoevelaken (NL); Erik Jeroen Laheij, Amstelveen (NL); Dennis Stamires, Newport Beach, CA (US); Michael F. Brady, Studio City, CA (US); Francisco René Mas Cabre, Amstelveen (NL); Oscar René Chamberlain Pravia, Rio de Janeiro (BR); Henrique Soares Cerqueira, Rio de Janeiro (BR); Fabió Lopes De Azevedo, Rio de Janeiro (BR)

(73) Assignee: Albemarle Corporation, Baton Rouge, LA (US)

( * ) Notice: Subject to any disclaimer, the term of this patent is extended or adjusted under 35 U.S.C. 154(b) by 9 days.

(21) Appl. No.: 11/629,053

(22) PCT Filed: Jun. 16, 2005

(86) PCT No.: PCT/EP2005/006555

§ 371 (c)(1),
(2), (4) Date: Nov. 26, 2007

(87) PCT Pub. No.: WO2005/123881

PCT Pub. Date: Dec. 29, 2005

(65) Prior Publication Data

US 2008/0210600 A1 Sep. 4, 2008

(30) Foreign Application Priority Data

Sep. 20, 2004 (EP) .................................. 04077616

(51) Int. Cl.
*C10G 9/28* (2006.01)
(52) U.S. Cl. ...................... 208/127; 208/113; 208/118; 208/120.01; 208/126
(58) Field of Classification Search ................. 208/113, 208/213, 118, 120.01, 126, 127
See application file for complete search history.

(56) References Cited

U.S. PATENT DOCUMENTS

| | | | |
|---|---|---|---|
| 2,893,943 A | | 7/1959 | Vignovich |
| 4,002,575 A | * | 1/1977 | Ward .............................. 502/26 |
| 4,176,049 A | * | 11/1979 | Winter et al. .................. 208/70 |
| 4,689,137 A | * | 8/1987 | Clark ........................... 208/89 |
| 2002/0092812 A1 | | 7/2002 | Stamires et al. |
| 2002/0110520 A1 | | 8/2002 | Stamires et al. |
| 2004/0029717 A1 | * | 2/2004 | O'Connor et al. ............. 502/68 |

FOREIGN PATENT DOCUMENTS

WO    WO 00/42127    *   7/2000

* cited by examiner

*Primary Examiner*—Walter D Griffin
*Assistant Examiner*—Renee Robinson
(74) *Attorney, Agent, or Firm*—James A. Jubinsky

(57) ABSTRACT

Process for upgrading a liquid hydrocarbon feed comprising the steps of (a) preparing a slurry comprising the hydrocarbon feed having a boiling range above 350° C. and solid particles comprising a rehydratable material, (b) thermally treating said slurry at a temperature in the range of 250 to 550° C., (c) optionally separating the thermally treated slurry into (I) a lower boiling fraction and (ii) a higher boiling fraction containing the solid particles and formed coke, if any, and (d) separating the solid particles and formed coke, if any, from the thermally treated slurry resulting from step b) or the higher boiling fraction of step c).

15 Claims, 4 Drawing Sheets

PROCESS FOR UPGRADING LIQUID HYDROCARBON FEEDS

There are several hydrocarbon feeds that are so heavy in boiling range or so contaminated with metals and/or organic acids or other detrimental hetero-atom species like nitrogen, sulfur and/or oxygen, that direct processing in a Resid Fluid Catalytic Cracking (RFCC) and/or Resid Hydroprocessing (RHPC) unit is not an economically feasible or attractive option. Examples of such hydrocarbon feeds are heavy crude oils, condensates, tar sands, biomass, and bio waste. Usually, these feeds are processed via a thermal route, such as a coking or viscosity breaking (visbreaking).

Visbreaking is a mild cracking operation used to reduce the viscosity of residual fuel oils and residua. It is generally performed by passing a crude oil residuum through a furnace where it is heated to 455-510° C. under a pressure of 345-2070 kPa. The primary product is fuel oil, but also products in the gas oil and gasoline boiling ranges are produced. Subsequently, the cracked products are flash-distilled. The overhead from this flash-distillation is then fractionated to produce a low-quality gasoline as an overhead product and a light gas oil as bottom product. The flash-distillation residue is cooled with a gas oil flux and then sent to a vacuum fractionator. This yields a heavy gas oil distillate and a residual tar of reduced viscosity.

Coking is a generic term for a series of thermal processes used for the conversion of nonvolatile heavy feeds into lighter, distillable products. Coking is the most popular conversion choice for resids with low hydrogen content, high amounts of hetero-atoms, and high Conradson carbon content. During coking, hetero-atoms and metals are separated from the feed into a low-value by-product (coke), leaving the pendants for catalytic cracking.

Delayed coking is a semicontinuous process in which the feed is introduced into a product fractionator. The fractionator bottoms, including a recycle stream of heavy product, are heated in a furnace the outlet temperature of which varies from 480-515° C. The heated feed is then fed to coking drums, where the feed is cracked at a temperature of 415-450° C. and pressures in the range of 103-621 kPa. The cracked products leave as overhead materials, and coke deposits form on the inner surface of the drum. Overhead products are returned to the fractionator, where naphtha and heating oil fractions are recovered. The nonvolatile material is combined with preheated fresh feed and returned to the furnace. The coke drum is usually on stream for about 24 hours before becoming filled with porous coke, after which the coke is removed hydraulically.

Fluid coking is a continuous process in which residuum is converted into coke and overhead products by spraying into a fluidized bed of hot, fine coke particles, which permits the coking reactions to be conducted at higher temperatures and shorter contact times than can be done in delayed coking. Moreover, these conditions result in decreased yields of coke; greater quantities of more valuable liquid product are recovered in the fluid coking process. Fluid coking uses two vessels: a reactor and a burner; coke particles are circulated between the two to transfer heat generated by burning a portion of the coke to the reactor. The reactor holds a bed of fluidized coke particles, and steam is introduced at the bottom of the reactor to fluidize the bed.

It is further known to upgrade heavy oil in the presence of solid particles other than coke:

U.S. Pat. No. 5,055,179 discloses a process comprising heating of the heavy oil in the presence of water and a polyhydroxy metal bentonite to a temperature not exceeding 300° C.

U.S. Pat. No. 4,504,377 discloses a two-stage visbreaking process using steam. The second stage visbreaking involves the use of a bed of particulate solids, such as silica, alumina, silica-alumina, clay, raw coal, coke, or spent catalytic materials. The solids can be pyrolyzed to remove carbon, and subsequently recycled into the process.

EP 0 814 145 discloses a process for steam conversion of heavy hydrocarbon feedstocks using a catalytically active phase comprising a non-noble Group VIII metal and an alkali metal. These metals may be directly mixed with the feedstock, or may be supported in a support material. The process involves contacting the feedstock with steam in the presence of the catalyst at a pressure less than or equal to 300 psig and a temperature of 320-550° C.

U.S. 2004/0034262 discloses a process for the production of biomass, wherein a biomass-containing aqueous feed is subjected to a treatment at 100-250 bar, then heating the pressurized feed at a temperature of less than 280° C., and finally reacting the feed at a temperature exceeding 280° C. to provide liquid hydrocarbons.

EP 0 814 145 discloses a process for upgrading heavy hydrocarbons at 320-550° C. in the presence of steam, using a catalyst comprising a non-noble Group VIII metal and an alkali metal supported on a support material.

Although these prior art processes provide acceptable results, there is a continuous need for alternative processes for upgrading liquid hydrocarbon feeds.

Figure 1:
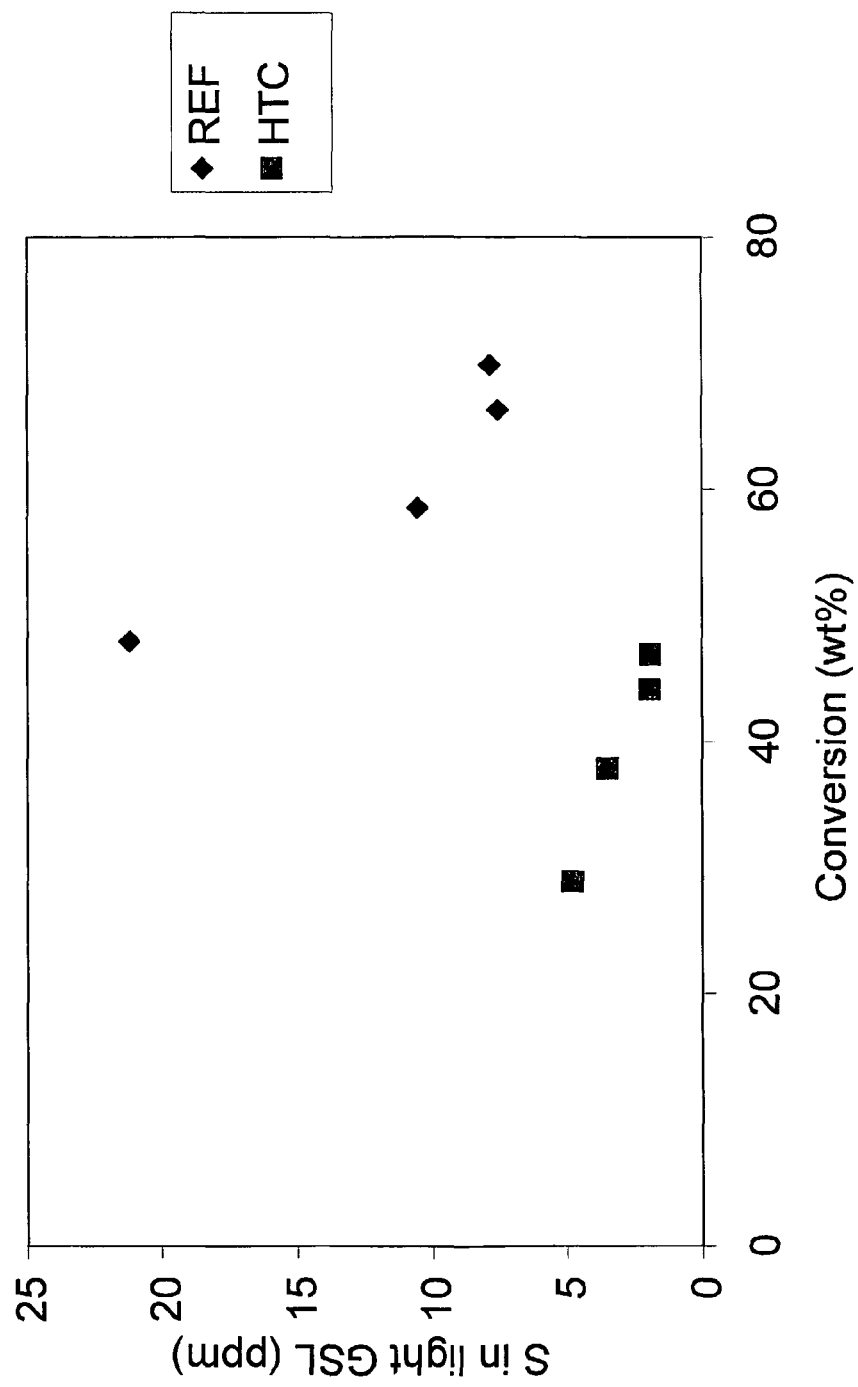
FIG. 1 is a graph plotting sulfur content in light gasoline vs. conversion utilizing hydrotalcite (HTC) in comparison to deactivated zeolite-containing FCC catalyst (REF) in the process of Example A.

The present invention provides a new, simple, and cost-effective process for upgrading hydrocarbon feeds to render them suitable for further treatment in (R)FCC and/or (R)HPC units. More in particular, the process of the present invention does not require separate addition of water or steam to the hydrocarbon feed.

This objective is met by the process according to the present invention, which process involves the steps of:
 a) preparing a slurry comprising the hydrocarbon feed having a boiling range above 350° C. and solid particles comprising a rehydratable material.
 b) thermally treating said slurry at a temperature in the range of 250 to 550° C.,
 c) optionally separating the thermally treated slurry into (i) a lower boiling fraction and (ii) a higher boiling fraction containing the solid particles and formed coke, if any, and d) separating the solid particles and formed coke, if any, from the thermally treated slurry resulting from step b) or the higher boiling fraction of step c).

In a preferred embodiment, the separated solid particles are rehydrated to the desired level—which, expressed in terms of LOI is at least 5 wt %—by contacting the solid particles with water or steam. The rehydrated solid particles can then be re-used in step a) of the above process.

During this process, hetero-atoms - like oxygen, nitrogen and sulfur—contained in the hydrocarbons are adsorbed by the solid particles or converted into lighter species, e.g. $H_2S$, $CO_2$, etc. and/or coke. Said lighter species and/or coke are separated from the more valuable hydrocarbons. Furthermore, at least part of the contaminated metals (like V, Ni and Fe) is adsorbed by the solid particles.

As a result, upon further processing of the resulting hydrocarbon streams in downstream processes—(R)FCC and/or (R)HPC—the catalysts used in these downstream processes will be less affected by these detrimental hetero-atom and/or metal species. Consequently, the conversion of these downstream processes will improve.

Step a)

The first step of the process involves preparing a slurry of (i) the liquid hydrocarbon feed having a boiling range above 350° C. and (ii) solid particles comprising a rehydratable material.

A rehydratable material is defined in this specification as a material that can release water from its structure (for instance upon heating), and subsequently take up water in its structure upon contact with water or steam.

The rehydratable material preferably contains water at the time it is used in step a). The Loss on Ignition (LOI), defined as the weight loss of the rehydratable material upon heating the catalyst for two hours at 600° C. ($LOI_{600}$) is a measure of the water content. The LOI of the rehydratable material added in step a) of the process of the present invention is preferably at least 5 wt %, more preferably at least 10 wt %, and most preferably at least 20 wt %.

Examples of rehydratable materials suitable for use in the process of the present invention include (i) layered materials, such as smectite clays, anionic clays, layered hydroxy salts, and cationic layered materials, (ii) zeolites, and (iii) silica-alumina gels.

These materials normally possess an LOI above 5 wt %. If desired, the LOI of the rehydratable material may be increased to a higher level by contacting the material with water or steam prior to its use in the process of the invention.

The slurry can be prepared by simply mixing the hydrocarbon feed and the solid particles. If the rehydratable material is a layered material, e.g. an anionic clay, smectite, cationic layered material, or layered hydroxy salt, and the hydrocarbon feed is polar in nature, the layered material may delaminate in the slurry, leading to nano-sized particles. This is desirable as it provides efficient use of catalytic material. The conditions required for delamination depend on, e.g., the type of layered material, the nature of the hydrocarbon feed and the kinetics of delamination in this system. In general, a temperature between 20-400° C., preferably 50-300° C., and most preferably 70-200° C. will be required for delamination.

Alternatively, if the hydrocarbon feed is not polar enough to cause delamination and delamination is desired, delamination can be initiated by suspending the solid particles in a polar hydrocarbon at a temperature in the above ranges, and then adding the resulting suspension to the hydrocarbon feed to form the slurry of step a).

The slurry of step a) may be mechanically treated, e.g. high-shear mixed and/or treated with ultrasound waves, in order improve the contact between the hydrocarbon feed and the solid particles.

The hydrocarbon feed to be upgraded has a boiling range above 350° C., preferably higher than 550° C. Said feed preferably has a Conradson Carbon content of at least 3, more preferably of at least 5, and may be contaminated with metals, organic acids, organic bases, coloring matter, and/or nitrogen-, sulfur-, and/or oxygen-containing compounds. Examples of such feeds are heavy crudes like marlim, cabiunas, batchaquero, maya, atmospheric residues and the even heavier vacuum residues, tar sands, shale oils, bio mass materials, etc.

Apart from the rehydratable material, the solid particles may in addition comprise other materials. Examples of such other materials are conventional catalyst components such as silica, alumina, zirconia, titania, boria, kaolin, acid leached kaolin, de-aluminated kaolin, bentonite, (modified or doped) aluminium phosphates, phosphates (e.g. meta or pyro phosphates), sorbents, fillers, and combinations thereof.

Preferably, the solid particles to be used according to the invention also contain metals like W, Mo, Ni, Co, Fe, V, and/or Ce. Such metals may introduce a hydrotreating function into the particles (especially W, Mo, Ni, Co, and Fe), or enhance the removal or sulfur- and/or nitrogen-containing species (Zn, Ce, V).

The particles may be a spent (resid) FCC catalyst containing the (thermally treated) layered material. This is a preferred embodiment of the present invention, as it involves re-use of waste material.

The solid particles to be used according to the invention preferably have a high accessibility, which makes them less vulnerable to blockage by coke during the process.

The accessibility can be measured by the method according to WO 02/99392, by adding 1 g of the solid particles to a stirred vessel containing 50 g of a 15 g/l Kuwait vacuum gas oil (KVGO) in toluene solution, circulating the solution between the vessel and a spectrophotometer, and measuring the KVGO-concentration continuously. The accessibility of the catalysts to KVGO is quantified by the Akzo Accessibility Index (AAI). The relative concentration of KVGO in the solution was plotted against the square root of time. The AAI is defined as the initial slope of this graph: $AAI=-d(C_t/C_0)/d(t^{1/2})*100\%$. In this equation, t is the time (in minutes) and $C_0$ and $C_t$ denote the concentrations of high-molecular weight compound in the solvent at the start of the experiment and at time t, respectively.

The AAI of the particles to be used in the process of the present invention preferably is higher than 10, more preferably higher than 20.

Smectite

Smectites are the 2:1 clay minerals that carry a lattice charge and characteristically expand when solvated with water and alcohols. The layers are negatively charged. Cations are hosted between the layers.

Examples of smectites are montmorillonite, hectorite, saponite, and sauconite, which are all Mg-, Al-, and Si-containing smectites.

Naturally occurring or synthetically prepared smectites can be used. A method for preparing Mg-, Al-, and Si-containing smectites is disclosed in WO 01/12319.

Thermal treatment, e.g. calcination at temperatures in the range 300-900° C., leads to the formation of activated smectite clays.

Anionic clay

Anionic clays are layered structures corresponding to the general formula

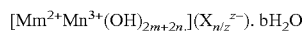

wherein $M^{2+}$ is a divalent metal, $M^{3+}$ is a trivalent metal, m and n have a value such that the ratio m/n=1 to 10, preferably 1 to 6, and b has a value in the range of from 0 to 10, generally a value of 2 to 6 and often a value of about 4. X is an anion with valance z, such as $CO_3^{2-}$, $OH^-$, or any other anion normally present in the interlayers of anionic clays. It is more preferred that the ratio m/n have a value of 2 to 4, more particularly a value close to 3.

In the prior art, anionic clays are also referred to as layered double hydroxides and hydrotalcite-like materials.

Anionic clays have a crystal structure consisting of positively charged layers built up of specific combinations of metal hydroxides between which there are anions and water molecules. Hydrotalcite is an example of a naturally occurring anionic clay, in which Al is trivalent metal, Mg is the divalent metal, and carbonate is the predominant anion present. Meixnerite is an anionic clay in which Al is trivalent metal, Mg is the divalent metal, and hydroxyl is the predominant anion present. In hydrotalcite-like anionic clays the brucite-like main layers are built up of octahedra alternating with interlayers in which water molecules and anions, more particularly carbonate ions, are distributed. The interlayers may contain anions such as $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such as $V_{10}O_{28}^{6-}$ and $Mo_7O_{24}^{6-}$, monocarboxylates such as acetate, dicarboxylates such as oxalate, alkyl sulfonates such as lauryl sulfonate.

Upon thermal treatment at a temperature above about 200° C., anionic clays are transformed into so-called solid solutions, i.e. mixed oxides that are rehydratable to anionic clays. At higher temperatures, above about 800° C., spinel-type structures are formed. These are not rehydratable to anionic clays.

For the purpose of the present invention various types of (thermally treated) anionic clays are suitable. Examples of suitable trivalent metals ($M^{3+}$) present in the (thermally treated) anionic clay include $Al^{3+}$, $Ga^{3+}$, $In^{3+}$, $Bi^{3+}$, $Fe^{3+}$, $Cr^{3+}$, $Co^{3+}$, $Sc^{3+}$, $La^{3+}$, $Ce^{3+}$, and combinations thereof. Suitable divalent metals ($M^{2+}$) include $Mg^{2+}$, $Ca^{2+}$, $Ba^{2+}$, $Zn^{2+}$, $Mn^{2+}$, $Co^{2+}$, $Mo^{2+}$, $Ni^{2+}$, $Fe^{2+}$, $Sr^{2+}$, $Cu^{2+}$, and combinations thereof. Especially preferred anionic clays are Mg—Al and Ca—Al anionic clays.

Suitable anionic clays can be prepared by any known process. Examples are co-precipitation of soluble divalent and trivalent metal salts and slurry reactions between water-insoluble divalent and trivalent metal compounds, e.g. oxides, hydroxides, carbonates, and hydroxycarbonates. The latter method provides a cheap route to anionic clays.

Layered Hydroxy Salts

Metal hydroxy salts (LHS) are distinguished from anionic clays in that they are built up of divalent metals only, whereas layered double hydroxides are built up of both a divalent and a trivalent metal.

An example of a LHS is a hydroxy salt of a divalent metal according to the following idealised formula: $[(Me^{2+},M^{2+})_2(OH)_3]^{+(Xn-)}{}_{1/n}]$, wherein $Me^{2+}$ and $M^{2+}$ can be the same or different divalent metal ions and $X^{n-}$ is an anion other than $OH^-$. Another example of LHS has the general formula $[(Me^{2+},M^{2+})_5(OH)_8]^{2+}(X^{n-})_{2/n}]$, wherein $Me^{2+}$ and $M^{2+}$ can be the same or different divalent metal ions and $X^{n-}$ is an anion other than $OH^-$.

If the LHS contains two different metals, the ratio of the relative amounts of the two metals may be close to 1. Alternatively, this ratio may be much higher, meaning that one of the metals predominates over the other. It is important to appreciate that these formulae are idealised, and that in practice the overall structure will be maintained, although chemical analysis may indicate compositions not satisfying the ideal formula.

Examples of suitable layered hydroxy salts with one type of metal are Zn-LHS (e.g. $Zn_5(OH)_8(X)_2$, $Zn_4(OH)_6X$, $Zn_5(OH)_6(X)_2.2H_2O$, $Zn_3(OH)_4(X)_2$), Co-LHS (e.g. $Co_2(OH)_3X$, Ni-LHS (e.g. $Ni_2(OH)_3X$), Mg-LHS (e.g. $Mg_2(OH)_3X$), Fe-LHS, Mn-LHS, and La-LHS ($La(OH)_2NO_3$). Examples of suitable layered hydroxy salts comprising two or more different types of metals are Zn—Cu LHS, Zn—Ni LHS, Zn—Co LHS, Fe—Co LHS, Zn—Mn LHS, Zn—Fe LHS, Ni—Cu LHS, Cu—Co LHS, Cu—Mg LHS, Cu—Mn LHS, Fe—Co LHS, Ni—Co LHS, Zn—Fe—Co LHS, Mg—Fe—Co LHS, and Ni—Cu—Co LHS. Especially preferred layered hydroxy salts are Zn—Mn LHS and Zn—Fe LHS.

Examples of suitable interlayer anions $X^{n-}$ are $NO_3^-$, $OH^-$, $Cl^-$, $Br^-$, $I^-$, $SO_4^{2-}$, $Sio_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such as $V_{10}O_{28}^{6-}$ and $Mo_7O_{24}^{6-}$, monocarboxylates such as acetate, dicarboxylates such as oxalate, alkyl sulfonates such as lauryl sulfonate. LHS exhanged with (bi)carbonates or organic anions provides the advantage that upon calcination, the anion will decompose, thereby increasing the porosity and surface area of the LHS Suitable methods for the preparation of layered hydroxy salts involve the reaction of a metal oxide with a dissolved metal salt (see *Inorg. Chem.* 32 (1993) 1209-1215) and (co-) precipitation from metal salt solutions (see *J. Solid State Chem.* 148 (1999) 26-40 and *J. Mater. Chem.* 1 (1991) 531-537). After preparation of the LHS, the interlayer anions may be exchanged, if so desired, by a regular ion-exchange procedure.

Upon thermal treatment of an LHS at a temperature above 300° C., metal oxides or mixed metal oxides are formed.

Cationic Layered Materials

Cationic Layered Materials (CLMs) are crystalline $NH_4$-Me(II)-TM-O phases with a characteristic X-ray diffraction pattern. In this structure, Me(II) represents a divalent metal and TM stands for a transition metal. The structure of a CLM consists of negatively charged layers of divalent metal octrahedra and transition metal tetrahedra with charge-compensating cations sandwiched between these layers. Suitable divalent metals are Zn, Mn, Co, Ni, Cu, Fe, Ca, and Ba, with Zn, Co, Mn, Cu, Ni, and Fe being preferred.

Suitable transition metals are Mo, W, V, Cr, Ti, and Zr, with Mo and W being preferred.

CLMs can be prepared by several methods. One method involves the reaction of an ammonium transition metal salt (e.g. ammonium heptamolybdate) and a divalent metal salt in aqueous ammonia solution. Upon evaporation of ammonia a precipitate is formed, which is then aged to form a CLM (M. P. Astier et al., *Ann. Chim. Fr.* Vol. 12, 1987, pp. 337-343).

A second method involves precipitation of a divalent metal salt and aluminium nitrate, followed by aging to form an anionic clay, calcination to form a mixed oxide, and contacting and reacting the mixed oxide with an ammonium transition metal salt (e.g. ammonium heptamolybdate) to form a CLM. (*Chem. Mater.* Vol. 8, 1996, 836-843; *ACS Symp. Ser.* Vol. 622, 1996, 237-249; *Stud. Surf, Sci. Catal.* Vol. 118, 1998, 359-367).

A third method is that according to WO 04/000731, which involves the steps of (a) preparing a slurry comprising a water-insoluble aluminium source and a divalent metal source, (b) drying the slurry of step a) and calcining the dried material to form a first calcined material, (c) optionally rehydrating the product of step b) to obtain an anionic clay, followed by calcining the anionic clay to form a second calcined material, (d) contacting a slurry of either the first or the second calcined material with an ammonium transition metal salt, and (e) aging the resulting slurry.

Upon thermal treatment of a CLM at a temperature above 300° C., solid solutions are formed; above 800° C. spinel-type structures are formed.

Zeolites

Suitable zeolites for use in the process of the present invention as rehydratable material include zeolite X, zeolite Y, Ultrastable zeolite Y (USY), zeolite Y exchanged with rare earth metals (RE-Y), zeolite USY exchanged with rare earth metals (RE-USY), ZSM-5, zeolite beta, and silicalite.

Silica-alumina gels may be prepared by the methods disclosed in U.S. Pat. No. 4,142,995 to Alfani et al. and in U.S. Pat. No. 4,259,210 to Alfani et al.

Step b)

The second step of the process involves thermal treatment of the slurry of feed and solid particles at temperatures in the range of 250-550° C., preferably 350-500° C. This thermal treatment can be performed in various types of reactors, e.g. ebullated bed reactors and slurry reactors. The pressure during this step generally varies from 1 to 50 bar.

The feed is preferably contacted with the solid particles for 1 to 1,200 seconds, preferably for 5 to 200 seconds.

The slurry may be high-shear mixed and/or treated with ultrasound waves during this thermal treatment.

If desired, water and/or hydrogen may be added during this process. The hydrogen partial pressure preferably ranges from 0 to 10 bar, more preferably 0 to 5 bar, more preferably 0 to 3 bar, and even more preferably 0 to 1 bar. Most preferably, the process of the invention is carried out without the addition of hydrogen.

Step c)

The thermally treated feed is optionally separated into a lower boiling and a higher boiling fraction in step c). Suitable forms of separation are distillation, flash-distillation, solvent extraction, centrifugation, nano-filtration and ultra-filtration.

The lower boiling fraction contains liquid products, which can suitably be treated in conventional FCC and HPC units. This fraction generally contains gases like $H_2S$ and hydrocarbons with boiling points up to 500° C.

The compounds in the higher boiling fraction generally have boiling points in the range from 450 to 1,050° C. This higher boiling fraction also contains solids: the solid particles containing the layered material and/or its heat-treated form, and formed coke, if any.

Step d)

The solids are then separated from the feed, i.e. the thermally treated feed resulting from step b) or—in case step c) is applied—the higher boiling fraction. Any conventional solid/liquid separation technique may be used, such as filtration and centrifugation. A further separation may be applied to remove asphaltenes, if present. This can be done by vacuum flashing and/or solvent extraction. The resulting liquid can be further treated in RFCC and/or RHPC processes.

The isolated solid particles may be contacted with water or steam in order to rehydrate them to an LOI of the desired level, but at least 5 wt %. They can then be re-used in the process according to the invention. Alternatively, the isolated solid particles can first be calcined, e.g. at 300-700° C., and then rehydrated by contact with water or steam.

The rehydration can be performed at temperatures in the range 20-300° C., preferably 30-250° C., most preferably 50-200° C. Both atmospheric and higher pressures may be used, the preferred pressure being autogeneous pressure.

Any formed coke may be used as fuel, for electrode manufacture, production of electricity or synthesis gas.

EXAMPLES

Example A

The use of hydrotalcite for removal of heteroatoms is demonstrated in this example. In this test the inorganic solid was heated up to a temperature of 640° C.

When the temperature of the solid reached this temperature a Kuwait VGO with a high sulfur content (3 wt %) was sprayed onto the hydrotalcite particles.

In a part of the liquid products that were collected after the test (the gasoline range, 40 to 221° C. boiling range) the S-content was analysed. At various solid-to-oil ratios the sulphur distribution was determined. For comparison, a deactivated zeolite-containing FCC catalyst (REF) was used to show the clear benefit of the use of hydrotalcite in the removal of heteroatoms.

Figure 2:
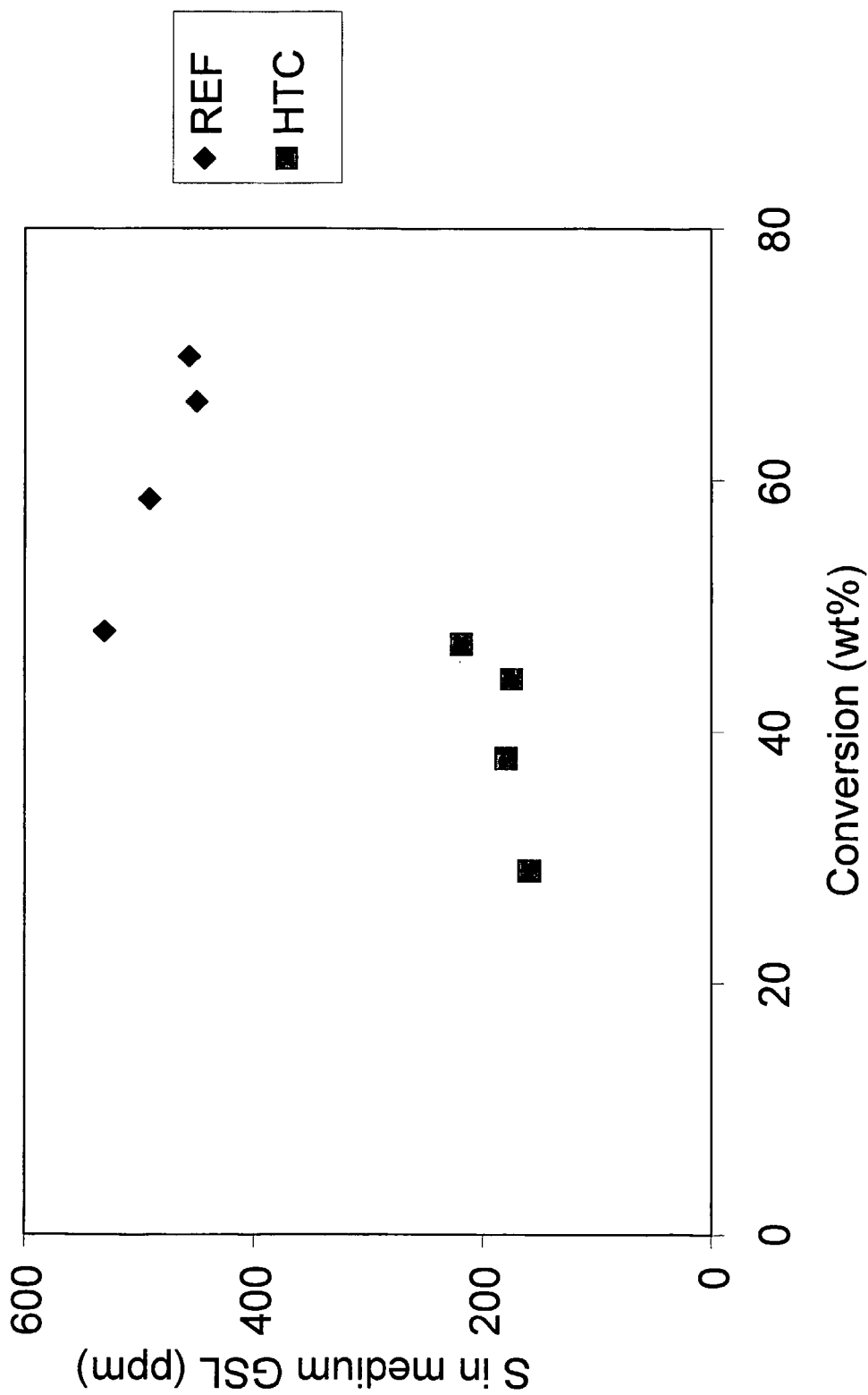
FIG. 2 is a graph plotting sulfur content in medium gasoline vs. conversion utilizing hydrotalcite (HTC) in comparison to deactivated zeolite-containing FCC catalyst (REF) in the process of Example A.
Figure 3:
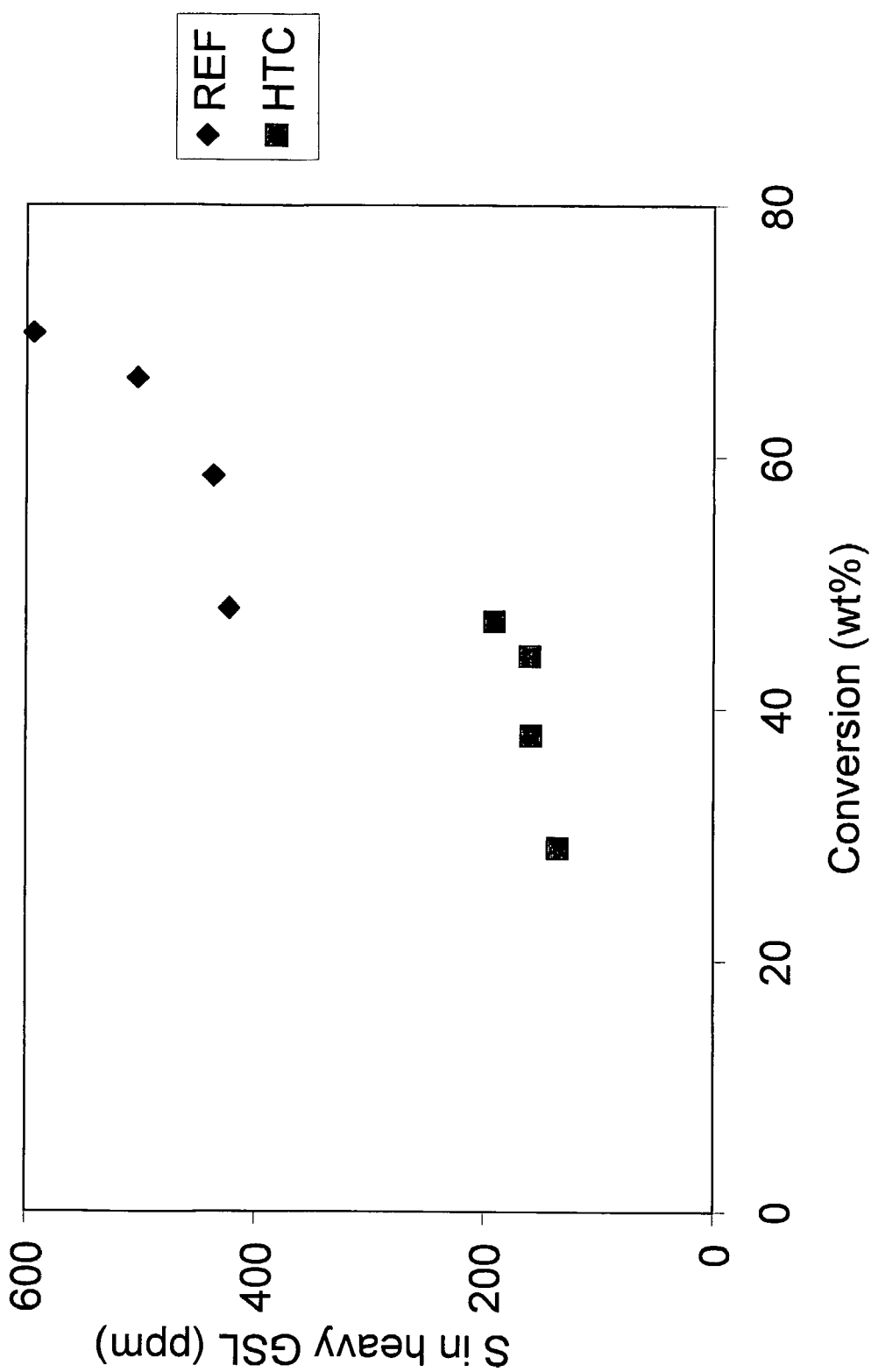
FIG. 3 is a graph plotting sulfur content in heavy gasoline vs. conversion utilizing hydrotalcite (HTC) in comparison to deactivated zeolite-containing FCC catalyst (REF) in the process of Example A.
Figure 4:
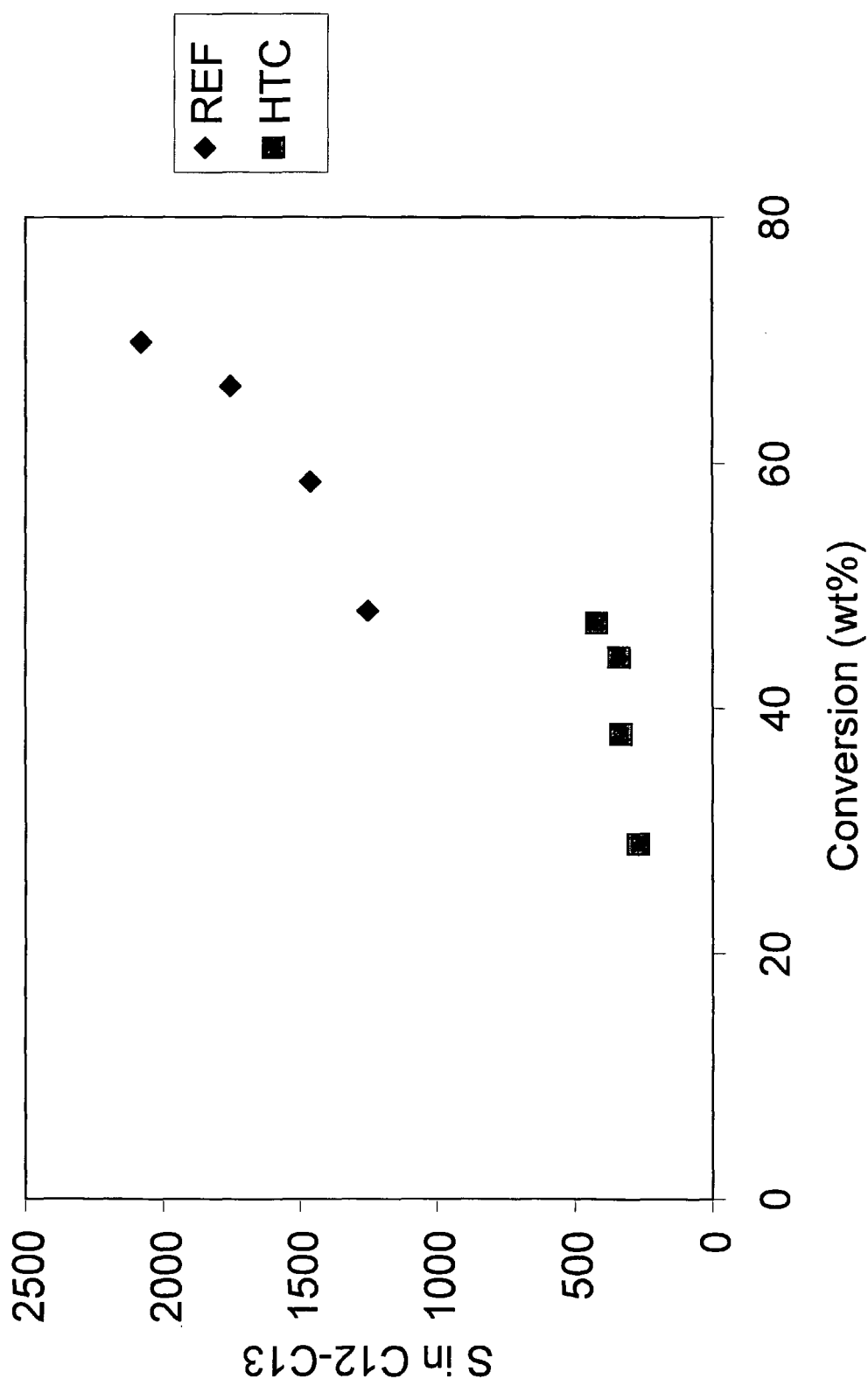
FIG. 4 is a graph plotting sulfur content in $C_{12}$-$C_{13}$ range molecules vs. conversion utilizing hydrotalcite (HTC) in comparison to deactivated zeolite-containing FCC catalyst (REF) in the process of Example A.

At 47% conversion a direct comparison could be made between the use of hydrotalcite (HTC) and conventional cracking of the oil. The use of hydrotalcite clearly lowered the sulphur content in the light gasoline (boiling range 40-90° C., FIG. 1), the medium gasoline (boiling range 90-150° C., FIG. 2), the heavy gasoline (boiling range 150-221° C., FIG. 3) and in the C12-C13 range molecules (FIG. 4). The removal is clearly not due to normal cracking reactions in the oil, as is shown by the products obtained after treatment of the oil with the reference FCC catalyst.

The removal of the sulfur in the light gasoline range was nearly complete, in the medium gasoline range roughly 60% less sulfur species were present, in the heavy gasoline range the reduction of sulfur species amounts to more than 50%.

Clearly, contacting oil with hydrotalcite is an efficient way to remove heteroatoms, as has been shown here by analysing the S distribution in the gasoline range of the oil.

Example B

A hydrotalcite-like adsorbent was synthesized according to the teachings of U.S. Pat. No. 6,541,409 and U.S. Pat. No. 6,468,488. The surface area of the hydrotalcite-like adsorbents was 200 $m^2/g$.

The adsorbent was used in a test similar to Example A. The pressure used was near atmospheric.

Data from Examples 1, 2, 3, 4 and 5 according to the invention are listed in Table 1 below. Table 1 also lists Comparative Examples 6 to 8, respectively an inert matrix, coke fines, and "blank", this latter meaning a thermal treatment alone.

The data clearly indicate the excellent achievement of the inventive process using an hydrotalcite-like adsorbent in reducing the naphthenic acid content of a crude oil, as reflected by the Total Acid Number for each test run.

TABLE 1

| Examples | Temperature, ° C. | Adsorbent | HTC/Oil Ratio | Total Acid Number (TAN), mg KOH/g oil |
| --- | --- | --- | --- | --- |
| 1 | 250 | Hydrotalcite | 0.1 | 1.35 |
| 2 | 350 | Hydrotalcite | 0.1 | 0.32 |
| 3 | 350 | Hydrotalcite | 0.02 | 0.53 |
| 4 | 350 | Hydrotalcite calcined at 350° C. | 0.1 | 0.13 |
| 5 | 350 | Hydrotalcite calcined at 400° C. | 0.1 | 0.12 |
| 6 | 350 | Inert Matrix | 5 | 1.5 |
| 7 | 350 | Coke Fines | 0.02 | 1.29 |
| 8 | 350 | Blank | 0.00 | 1.52 |

The invention claimed is:

1. A process for upgrading a liquid hydrocarbon feed comprising the steps of:
  a) preparing a slurry comprising the hydrocarbon feed having a boiling range above 350° C. and solid particles comprising a rehydratable material having a Loss on Ignition (LOI) of at least 5%, wherein said rehydratable material is a Mg—Al anionic clay, Ca—Al anionic clay, layered hydroxy salt, cationic layered materials, zeolites or silica-alumina gels;
  b) thermally treating said slurry at a temperature in the range of 250 to 550° C. without the addition of hydrogen, c) optionally separating the thermally treated slurry into (i) a lower boiling fraction and (ii) a higher boiling fraction containing the solid particles and formed coke, if any, and d) separating the solid particles and formed coke, if any, from the thermally treated slurry resulting from step b) or the higher boiling fraction of step c).

2. The process of claim 1 wherein the solid particles separated in step d) are rehydrated to the desired LOI by contacting the solid particles with water or steam.

3. The process of claim 2 wherein the solid particles separated in step d) are calcined before being rehydrated.

4. The process of claim 2 or 3 wherein the rehydrated solid particles are reused in step a).

5. The process of claim 4 wherein separation step c) is performed by (flash) distillation.

6. The process of claim 1 wherein the hydrocarbon feed has a boiling range above 550° C.

7. The process of claim 1 wherein the slurry in steps a) and/or b) is high-shear mixed and/or treated with ultrasound waves.

8. The process according to claim 7 wherein step c) is performed and wherein the higher boiling fraction obtained in this step after performing step d) is subjected to resid fluid catalytic cracking or resid hydroprocessing.

9. The process of claim 1 wherein the hydrocarbon feed is contaminated with metals, organic acids, organic bases, coloring and/or nitrogen-, sulfur-, and/or oxygen-containing compounds.

10. The process of claim 1 wherein the rehydratable material is a layered material.

11. The process of claim 10 wherein the rehydratable material is a Mg—Al or Ca—Al anionic clay.

12. The process of claim 1 wherein the liquid obtained in step d) is subsequently treated in a fluid catalytic cracking unit or a hydroprocessing unit.

13. The process of claim 1 wherein step c) is performed and the lower boiling fraction obtained in this step is subsequently treated in a fluid catalytic cracking unit or a hydroprocessing unit.

14. The process of claim 1 wherein the rehydratable material has a Loss on Ignition (LOI) of at least 10%.

15. The process of claim 1 wherein the rehydratable material has a Loss on Ignition (LOI) of at least 20%.

* * * * *